United States Patent
Hatano et al.

(10) Patent No.: US 11,623,711 B2
(45) Date of Patent: Apr. 11, 2023

(54) SEAT RAIL STRUCTURE FOR MOTORCYCLE

(71) Applicant: Suzuki Motor Corporation, Hamamatsu (JP)

(72) Inventors: Daisuke Hatano, Hamamatsu (JP); Kyohei Ikoma, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 154 days.

(21) Appl. No.: 17/066,540

(22) Filed: Oct. 9, 2020

(65) Prior Publication Data
US 2021/0163093 A1    Jun. 3, 2021

(30) Foreign Application Priority Data

Nov. 28, 2019  (JP) .............................. JP2019-215291

(51) Int. Cl.
*B62K 11/04*    (2006.01)
*B62J 35/00*    (2006.01)
*B62K 15/00*    (2006.01)

(52) U.S. Cl.
CPC .............. *B62K 11/04* (2013.01); *B62J 35/00* (2013.01); *B62K 2015/001* (2013.01)

(58) Field of Classification Search
CPC ... B62K 11/04; B62K 19/16; B62K 2015/001
USPC ...................................................... 180/219
See application file for complete search history.

(56) References Cited

U.S. PATENT DOCUMENTS

| 5,248,012 A * | 9/1993 | Kurawaki ............ B62K 25/005 |
| | | 180/219 |
| 6,325,169 B1 * | 12/2001 | Tateshima ............... F02B 61/02 |
| | | 180/219 |
| 6,478,105 B2 * | 11/2002 | Okuma .............. F02M 35/1017 |
| | | 180/219 |

(Continued)

FOREIGN PATENT DOCUMENTS

| DE | 102019128859 A1 * | 4/2021 | |
| EP | 2881313 A1 * | 6/2015 | ............. B62K 19/16 |

(Continued)

OTHER PUBLICATIONS

German Office Action for corresponding German Application No. 102020123193.8 dated Nov. 15, 2021, 7 pgs.

*Primary Examiner* — Jacob B Meyer
*Assistant Examiner* — Myles A Harris
(74) *Attorney, Agent, or Firm* — Lerner, David, Littenberg & Krumholz & Mentlik, LLP

(57) ABSTRACT

The present invention relates to a seat rail structure for a motorcycle having a seat rail on a vehicle body. In this structure, the seat rail has a side member being a bent product of continuous fiber reinforced resin, the side member has: a side wall at an outer end in a width direction of a vehicle body; and an upper flange at an upper end of the side wall to protrude from the side wall inward in the width direction, the side wall has an upper fastening portion at an upper end section of a front end region, fastened to a main frame, the upper fastening portion has an upper corner edge portion straddling front edge and upper edge portions, the upper corner edge portion is arcuate, and a rear end of the upper corner edge portion is frontward relative to a front edge portion of the upper flange.

7 Claims, 4 Drawing Sheets

(56) References Cited

U.S. PATENT DOCUMENTS

| | | | | |
|---|---|---|---|---|
| 6,688,274 B2* | 2/2004 | Yokoyama | B62K 11/04 | 180/219 |
| 6,695,330 B2* | 2/2004 | Hata | B62K 11/00 | 180/219 |
| 7,188,695 B2* | 3/2007 | Miyakawa | B62K 11/04 | 180/219 |
| 7,299,889 B2* | 11/2007 | Yokomizo | B62K 11/04 | 180/219 |
| 7,383,909 B2* | 6/2008 | Kawase | B62K 11/04 | 280/281.1 |
| 7,845,450 B2* | 12/2010 | Kato | B62K 19/30 | 180/311 |
| 7,905,506 B2* | 3/2011 | Ishikawa | B62K 19/46 | 180/219 |
| 7,971,672 B2* | 7/2011 | Kubo | B62K 11/04 | 180/219 |
| 8,157,041 B2* | 4/2012 | Kawai | B62K 11/04 | 180/68.1 |
| 8,167,382 B2* | 5/2012 | Tahara | B60T 13/745 | 180/311 |
| 8,272,656 B2* | 9/2012 | Katsura | B62K 19/28 | 280/281.1 |
| 8,366,169 B2* | 2/2013 | Shigeta | B62K 19/46 | 296/37.15 |
| 8,448,738 B2* | 5/2013 | Goto | B62K 11/04 | 180/219 |
| 8,550,202 B2* | 10/2013 | Watanabe | B62K 19/30 | 180/231 |
| 8,944,197 B2* | 2/2015 | Matsushima | B60K 13/02 | 180/68.3 |
| 9,010,295 B2* | 4/2015 | Yamagishi | F02M 35/162 | 123/41.86 |
| 9,022,157 B2* | 5/2015 | Konno | B62K 19/30 | 180/311 |
| 9,045,187 B2* | 6/2015 | Komatsu | B62K 19/40 | |
| 9,150,270 B2* | 10/2015 | Nishida | F02M 37/0094 | |
| 9,457,863 B2* | 10/2016 | Sugita | B62K 11/04 | |
| 9,776,500 B2* | 10/2017 | Inagaki | B60K 11/04 | |
| 9,802,589 B2* | 10/2017 | Kitagawa | G01D 11/30 | |
| 9,957,012 B2* | 5/2018 | Ishii | B62K 19/18 | |
| 10,202,948 B2* | 2/2019 | Murayama | F02M 35/10085 | |
| 10,717,486 B2* | 7/2020 | Suzuki | B62K 11/02 | |
| 10,843,762 B2* | 11/2020 | Yamamoto | B62K 25/20 | |
| 11,225,298 B2* | 1/2022 | Golling | B62J 35/00 | |
| 2004/0124024 A1* | 7/2004 | Kurayoshi | B62K 11/04 | 180/219 |
| 2004/0154852 A1* | 8/2004 | Miyashiro | B62K 19/12 | 180/219 |
| 2006/0210734 A1* | 9/2006 | Lin | B62K 19/16 | 428/34.1 |
| 2007/0125584 A1* | 6/2007 | Tsuya | B62J 1/12 | 180/219 |
| 2007/0188012 A1* | 8/2007 | Hariu | B60T 8/3225 | 303/3 |
| 2008/0110688 A1* | 5/2008 | Miyashiro | B62K 11/04 | 180/311 |
| 2009/0194355 A1* | 8/2009 | Yamamoto | B62K 19/30 | 180/312 |
| 2009/0242305 A1* | 10/2009 | Asano | B62K 11/04 | 180/219 |
| 2009/0243374 A1* | 10/2009 | Tahara | B60T 8/3225 | 303/3 |
| 2009/0243375 A1* | 10/2009 | Tahara | B60T 7/085 | 303/3 |
| 2009/0243381 A1* | 10/2009 | Tahara | B60T 8/3685 | 303/114.1 |
| 2013/0278025 A1* | 10/2013 | Wakabayashi | B62K 11/04 | 297/195.1 |
| 2015/0060177 A1* | 3/2015 | Matsushima | B62K 11/04 | 180/219 |
| 2015/0075889 A1* | 3/2015 | Eguchi | B62J 43/28 | 180/220 |
| 2016/0200387 A1* | 7/2016 | Matsushima | B62K 11/04 | 180/219 |
| 2018/0072368 A1* | 3/2018 | Matsuo | B62K 11/02 | |
| 2018/0093730 A1* | 4/2018 | Matsuo | B32B 5/024 | |
| 2018/0339739 A1* | 11/2018 | Kondo | B62J 25/06 | |
| 2019/0100264 A1* | 4/2019 | Hatano | B62K 19/02 | |
| 2020/0247082 A1* | 8/2020 | Hatano | B32B 3/02 | |
| 2020/0269942 A1* | 8/2020 | Kondo | B62J 25/06 | |
| 2021/0147025 A1* | 5/2021 | Hatano | B62K 11/04 | |
| 2021/0163093 A1* | 6/2021 | Hatano | B62J 1/08 | |
| 2021/0301772 A1* | 9/2021 | Yagi | F02M 35/044 | |
| 2022/0119059 A1* | 4/2022 | Hatano | B62K 19/06 | |
| 2022/0119060 A1* | 4/2022 | Hatano | B62K 19/16 | |
| 2022/0119070 A1* | 4/2022 | Yagi | B62J 43/30 | |
| 2022/0126940 A1* | 4/2022 | Suzuki | B62K 11/04 | |

FOREIGN PATENT DOCUMENTS

| | | | |
|---|---|---|---|
| JP | 2018039484 A | | 3/2018 |
| JP | 2018199405 A | | 12/2018 |
| JP | 2020172163 A | * | 10/2020 |
| WO | 2015033425 A1 | | 3/2015 |

* cited by examiner

SEAT RAIL STRUCTURE FOR MOTORCYCLE

CROSS-REFERENCE TO RELATED APPLICATIONS

The present application claims priority from Japanese Patent Application No. 2019-215291 filed Nov. 28, 2019, the disclosure of which is hereby incorporated herein by reference.

BACKGROUND OF THE INVENTION

The present invention relates to a seat rail structure to be disposed on a motorcycle, that is, a seat rail structure for a motorcycle.

Typically, a seat rail to be disposed on a motorcycle, may play a role of supporting a seat, a fuel tank, and/or the like. It is desired for such a seat rail to increase the strength for supporting the seat, the fuel tank, and/or the like. Furthermore, the seat rail may include a portion to be exposed to an outer portion of the motorcycle. It is also desired for such a seat rail to avoid poor appearance. Accordingly, to satisfy these desires, various seat rail structures, that is, various seat rail structures for a motorcycle, have been suggested.

In a structure cited as one example of the seat rail structure for a motorcycle, a rear frame (a seat rail) is made of fiber reinforced resin, and furthermore, the rear frame has: two upper side portions (side walls) spaced apart from each other in a left-right direction; and two attaching portions respectively protruding toward a front side from front ends of the two upper side portions to be attached to a main frame of a vehicle body. Furthermore, each upper side portion has a flange protruding from its upper end edge toward an inner side in the left-right direction, and each attaching portion has a flange protruding from its outer peripheral edge toward the inner side in the left-right direction. In addition, the flange at the upper end edge of each upper side portion, and the flange at an upper end edge of the outer peripheral edge of the attaching portion corresponding to the upper side portion, are connected such that they are continuous in a front-rear direction (See for example, JP 2018-039484 A).

BRIEF SUMMARY OF THE INVENTION

However, in the above-described example of a seat rail structure for a motorcycle, typically, the seat rail is formed by bending a plate material made of fiber reinforced resin while heating and pressurizing the plate material. In this case, the circumferential length of a portion which corresponds to a flange positioned at the arcuate outer peripheral edge of the attaching portion in the plate material before forming (hereinafter, this is referred to as "a flange corresponding portion"), is longer than the circumferential length of the flange in the seat rail after forming. Consequently, the flange corresponding portion has an excess portion. In particular, when a plate material having continuous fibers is heated and pressurized, fluidity of fibers cannot be sufficiently obtained, so that the plate material is difficult to follow to be in a three-dimensional shape. In such a case, the fibers are redundant in the excess portion, and corrugation may be generated at the flange. Such corrugation may cause poor appearance of the seat rail. The corrugation may also deteriorate the strength of the seat rail. Furthermore, the above-described bending has room for improvement in view of manufacturing efficiency of the seat rail, such as ease of forming the flange, and/or the like.

In view of such circumstances, in the seat rail structure for a motorcycle, it is desired that poor appearance of a seat rail be prevented, the strength of the seat rail be efficiently improved, and manufacturing efficiency of the seat rail be improved.

To solve the problems, a seat rail structure for a motorcycle according to one aspect includes a seat rail disposed on a vehicle body of the motorcycle, wherein the seat rail has a side member which is positioned at a lateral side in a width direction of a vehicle body and is a bent product made of continuous fiber reinforced resin, the side member has: a side wall positioned at an outer end in the width direction of the vehicle body; and an upper flange positioned at an upper end, in an upper-lower direction of the vehicle body, of the side wall to protrude from the side wall inward in the width direction of the vehicle body, the side wall has an upper fastening portion which is positioned at an upper end section, in the upper-lower direction of the vehicle body, of a front end region in a front-rear direction of the vehicle body and is fastened to a main frame of the vehicle body, the upper fastening portion has an upper corner edge portion positioned so as to straddle a front edge portion in the front-rear direction of the vehicle body and an upper edge portion in the upper-lower direction of the vehicle body, the upper corner edge portion is formed to be arcuate, and a rear end, in the front-rear direction of the vehicle body, of the upper corner edge portion, is disposed frontward in the vehicle body relative to a front edge portion, in the front-rear direction of the vehicle body, of the upper flange.

In the seat rail structure for a motorcycle according to one aspect, poor appearance of a seat rail can be prevented, the strength of the seat rail can be efficiently improved, and manufacturing efficiency of the seat rail can be improved.

DETAILED DESCRIPTION

A seat rail structure for a motorcycle according to one Embodiment will be described below, together with the motorcycle to which the seat rail structure is applied. Here, the motorcycle to which the seat rail structure for a motorcycle (hereinafter, this is merely referred to as "a seat rail structure" as necessary) is applied, includes one front wheel and one rear wheel, typically. However, the motorcycle may include two front wheels and one rear wheel.

In this Embodiment, in FIGS. 1 to 4, a front side of a vehicle body of the motorcycle (hereinafter, this is merely referred to as "a front side" as necessary) is shown by a single-headed arrow F, and a rear side of the vehicle body (hereinafter, this is merely referred to as "a rear side" as necessary) is shown by a single-headed arrow R. Consequently, a front-rear direction of the vehicle body (hereinafter, this is merely referred to as "a front-rear direction" as necessary) is shown by the single-headed arrow F and the single-headed arrow R. In FIGS. 2 and 4, a width direction of the vehicle body (hereinafter, this is merely referred to as "a width direction" as necessary) is shown by a double-headed arrow W. In FIGS. 1 to 4, an upper side of the vehicle body (hereinafter, this is merely referred to as "an upper side" as necessary) is shown by a single-headed arrow U, and a lower side of the vehicle body (hereinafter, this is merely referred to as "a lower side" as necessary) is shown by a single-headed arrow D. An upper-lower direction of the vehicle body (hereinafter, this is merely referred to as "an upper-lower direction" as necessary) is shown by the single-headed arrow U and the single-headed arrow D.

Figure 1:
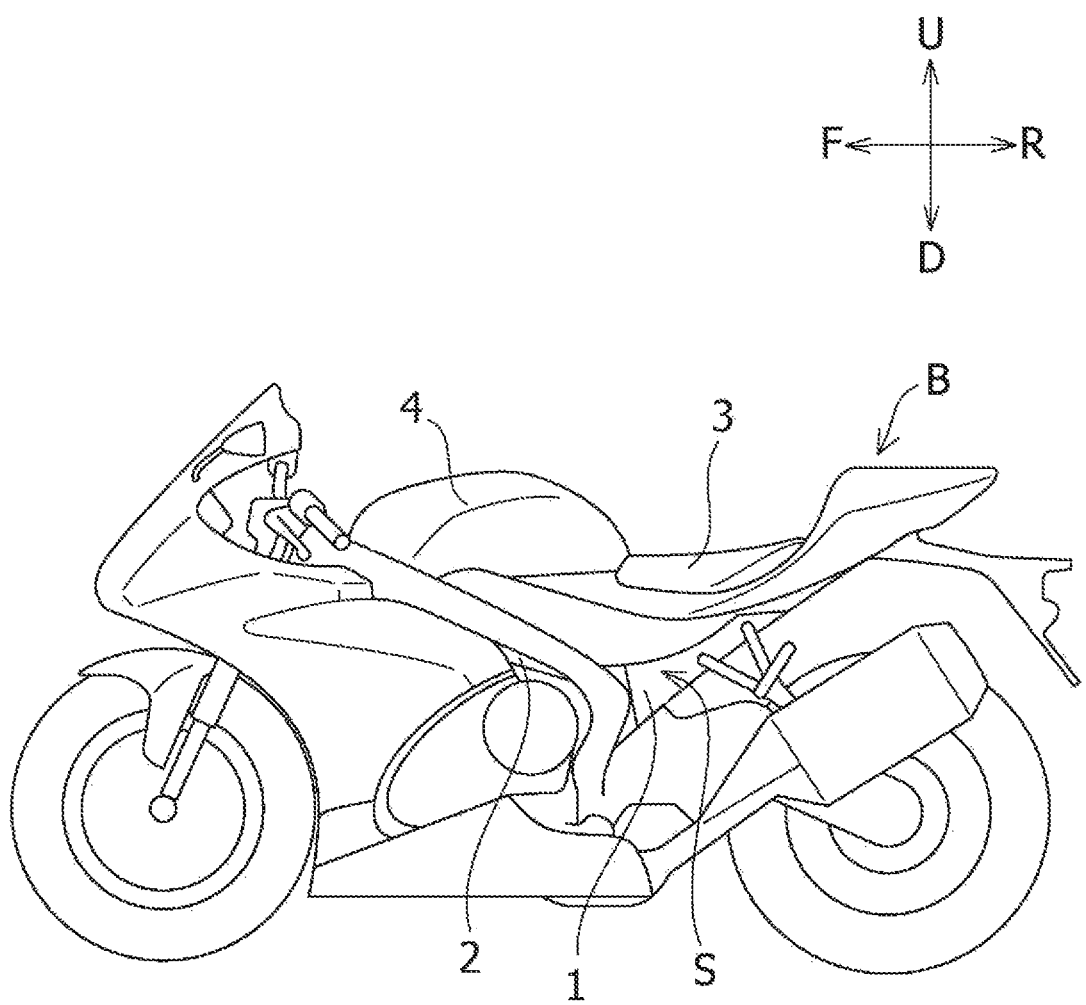
FIG. 1 is a side view schematically showing a motorcycle having a seat rail structure according to one Embodiment.
Figure 2:
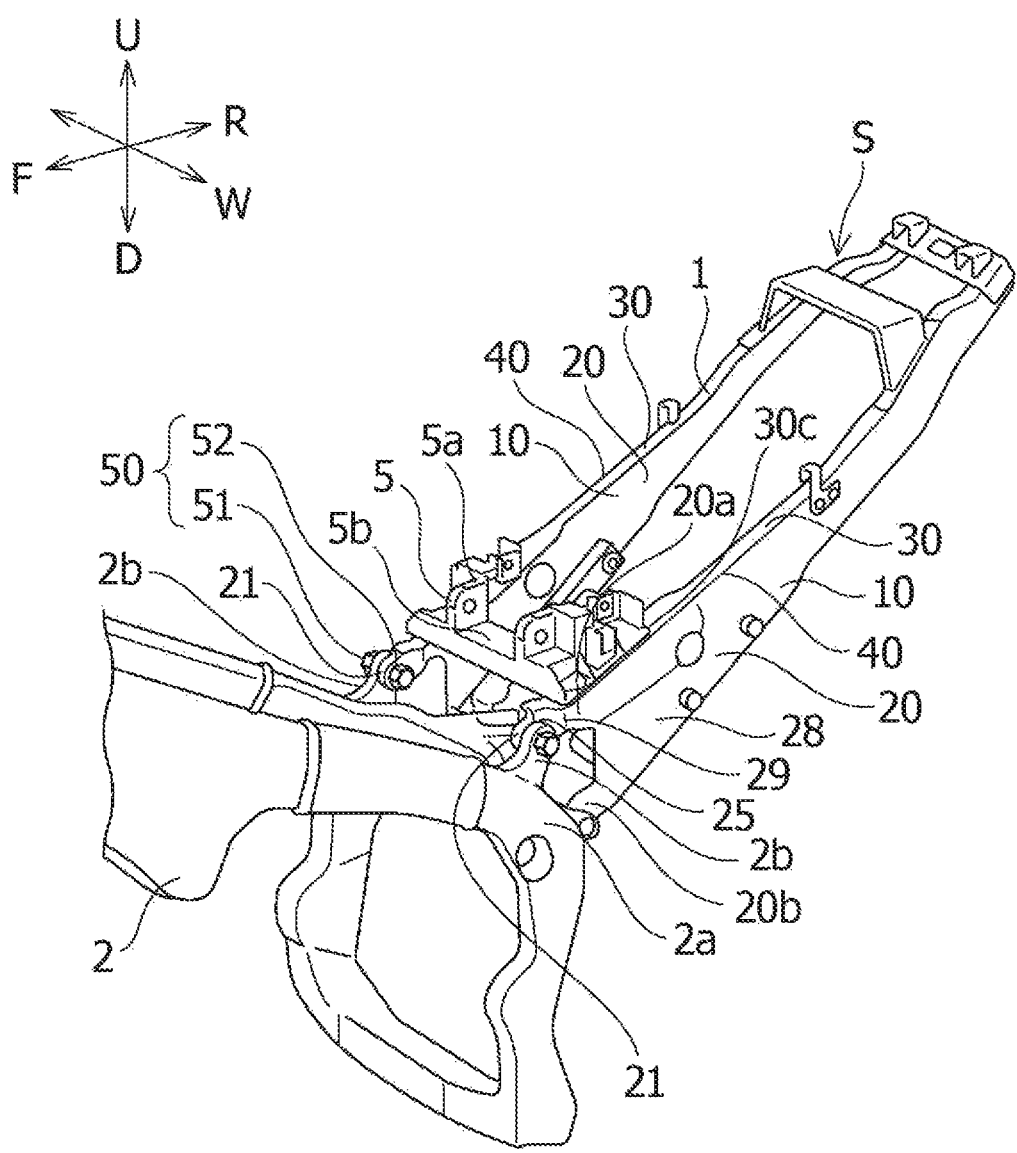
FIG. 2 is a perspective view schematically showing a seat rail and its peripheral part in the seat rail structure according to the Embodiment.
Figure 3:
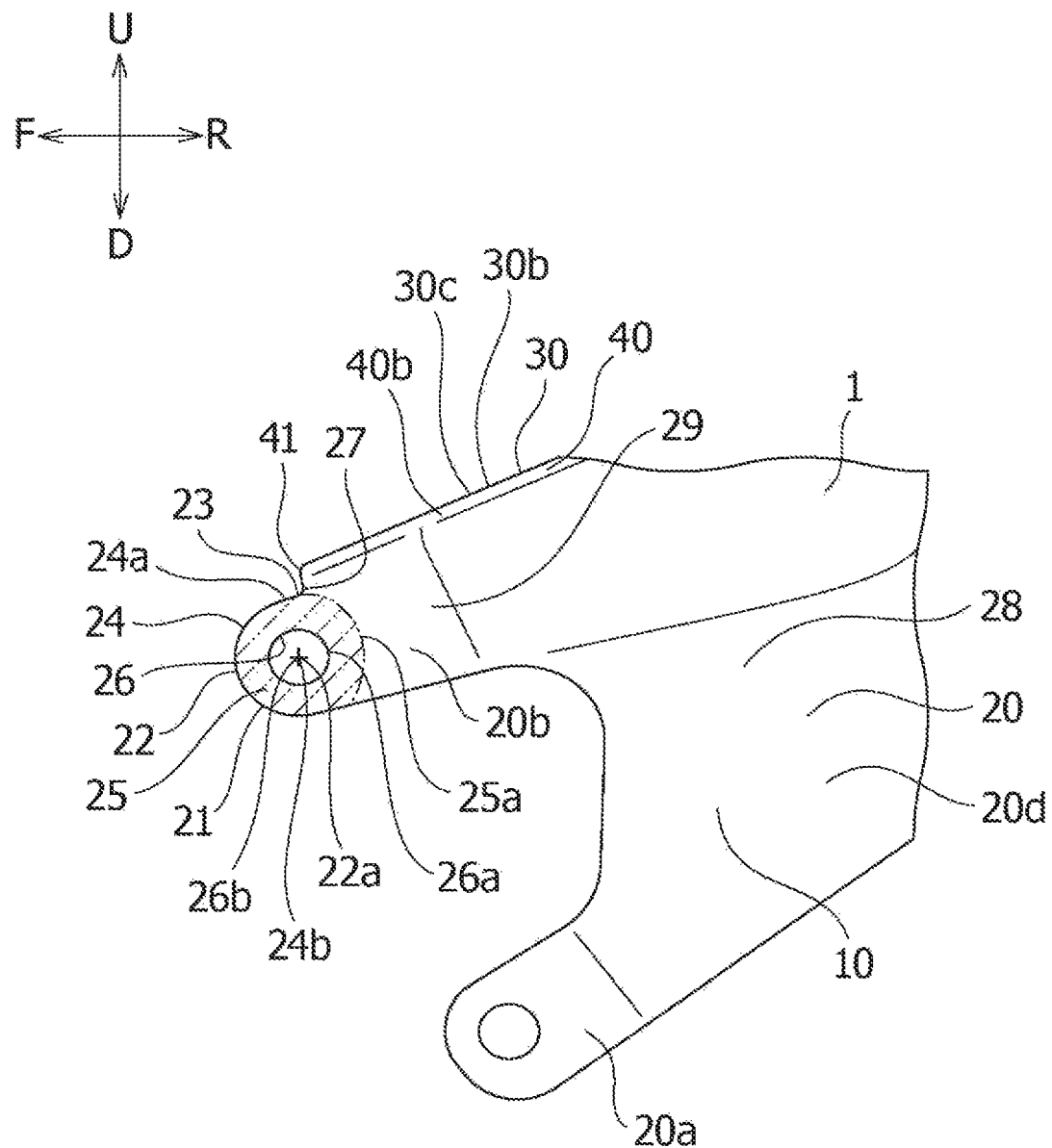
FIG. 3 is a side view schematically showing a front end region and its peripheral region of a side wall of the seat rail in the seat rail structure according to the Embodiment, seen from an outer side in a width direction of a vehicle body.
Figure 4:
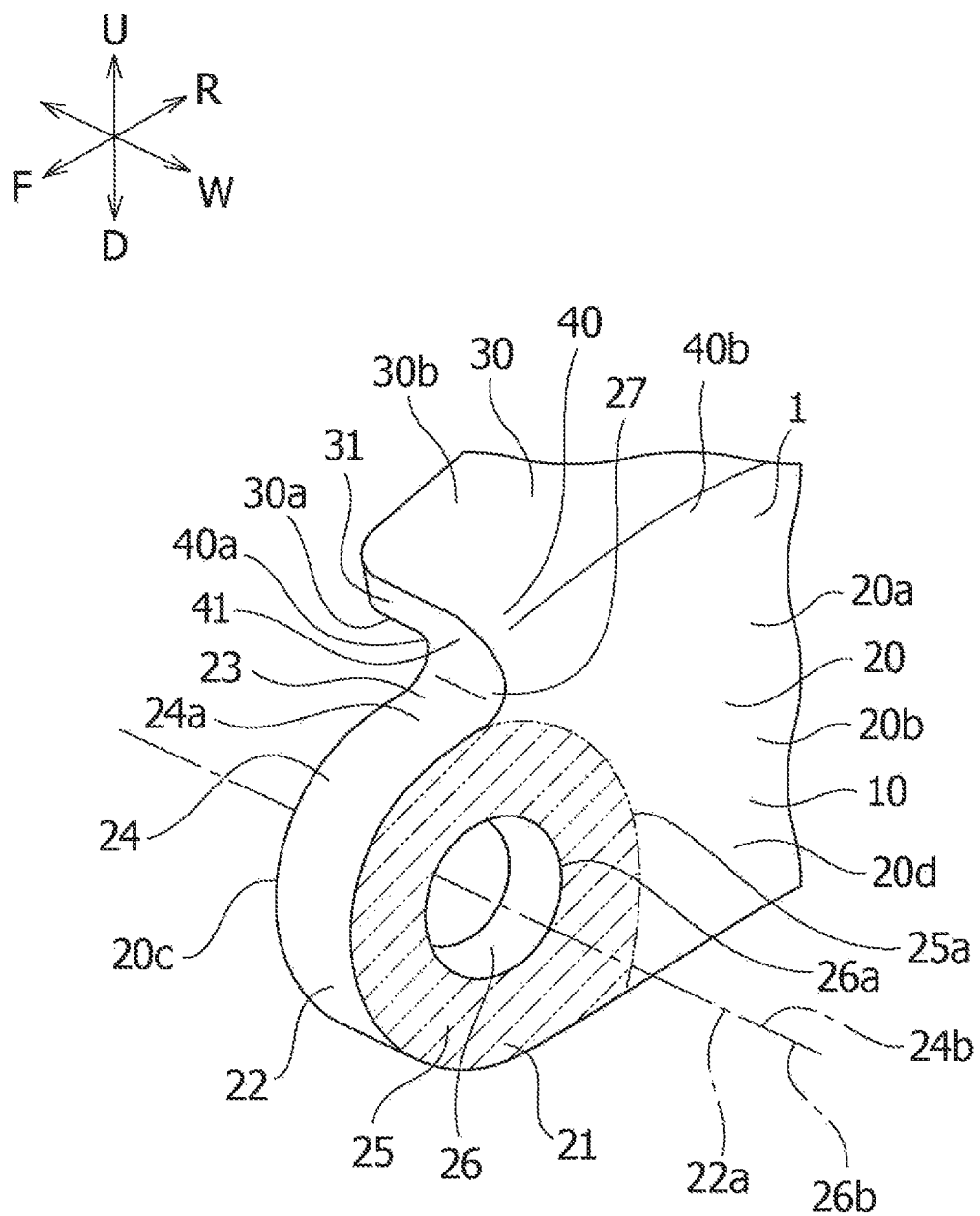
FIG. 4 is a perspective view schematically showing an upper fastening portion and its peripheral portion of the side wall in the seat rail structure according to the Embodiment.

With reference to FIGS. 1 to 4, the outline of a seat rail structure S and a motorcycle according to this Embodiment will be described. In other words, the seat rail structure S and the motorcycle are schematically configured as follows. As shown in FIG. 1, the seat rail structure S is applied to the motorcycle. As shown in FIGS. 1 to 4, the seat rail structure S has a seat rail 1 disposed on a vehicle body B of the motorcycle.

As shown in FIG. 2, the seat rail 1 has two side members 10 which are respectively positioned at both sides in a width direction. The two side members 10 are disposed to be spaced apart from each other in the width direction. The seat rail structure S according to this Embodiment is configured such that each of the two side members 10 has components which will be described in detail below. The components in the two side members 10 are substantially symmetrical in the width direction. However, the seat rail may be configured such that only one of the two side members has the following components. Based on this, hereinafter, it is assumed that components of one of the two side members 10 are typically described unless the two side members 10 and components related to the two side members 10, are described specifically.

Each side member 10 is a bent product made of continuous fiber reinforced resin. As shown in FIGS. 2 to 4, each side member 10 has: a side wall 20 positioned at an outer end in the width direction; and an upper flange 30 positioned at an upper end in an upper-lower direction of the side wall 20 to protrude from the side wall 20 toward an inner side in the width direction. The side wall 20 of each side member 10 has an upper fastening portion 21 which is positioned at an upper end section 20*b*, in the upper-lower direction, of a front end region 20*a* in a front-rear direction and is fastened to a main frame 2 of the vehicle body B.

As shown in FIGS. 3 and 4, the upper fastening portion 21 has an upper corner edge portion 24 positioned so as to straddle a front edge portion 22 in the front-rear direction and an upper edge portion 23 in the upper-lower direction. The upper corner edge portion 24 is formed to be substantially arcuate. A rear end 24*a*, in the front-rear direction, of the upper corner edge portion 24 is disposed frontward relative to a front edge portion 31, in the front-rear direction, of the upper flange 30.

Furthermore, the seat rail structure S and the motorcycle can be schematically configured as follows. As shown in FIGS. 3 and 4, the upper fastening portion 21 has a frame abutting surface 25 which abuts the main frame 2 in the width direction. A rear end 25*a*, in the front-rear direction, of the frame abutting surface 25 is disposed rearward relative to the front edge portion 31 of the upper flange 30. Additionally, in FIGS. 3 and 4, the frame abutting surface 25 is within a range of hatching made of oblique lines drawn with phantom lines. As shown in FIGS. 3 and 4, the upper fastening portion 21 has a fastening hole 26 penetrating in the width direction to be used for fastening to the main frame 2. A rear end 26*a*, in the front-rear direction, of the fastening hole 26 is disposed rearward relative to the front edge portion 31 of the upper flange 30.

Each side wall 20 has a connecting edge portion 27 which connects the upper edge portion 23 of the upper fastening portion 21 and the front edge portion 31 of the upper flange 30 in the front-rear direction. The connecting edge portion 27 is formed to be substantially arcuate. As shown in FIG. 4, each side member 10 has an upper connecting portion 40 which connects the side wall 20 and the upper flange 30. The upper connecting portion 40 has: an inner surface 40*a* which connects an inner surface 20*c*, in the width direction, of the side wall 20, and a lower surface 30*a*, in the upper-lower direction, of the upper flange 30; and an outer surface 40*b* which connects an outer surface 20*d*, in the width direction, of the side wall 20, and an upper surface 30*b*, in the upper-lower direction, of the upper flange 30. The inner surface 40*a* and the outer surface 40*b* of the upper connecting portion 40 are respectively formed to be substantially arcuate.

As shown in FIGS. 2 and 3, the side wall 20 has: a main body portion 28 positioned at the rear side and an outer side in the width direction of the upper fastening portion 21; and a stepped portion 29 which connects the upper fastening portion 21 and the main body portion 28. As shown in FIG. 2, the upper surface 30*b* in the upper-lower direction of the upper flange 30 in the two side members 10 includes an attachment bearing surface 30*c* to be used for attachment of a seat 3 and/or a fuel tank 4 (shown in FIG. 1).

With reference to FIGS. 1 and 2, the details of the motorcycle will be described. In other words, the motorcycle can be configured in detail as follows. As shown in FIG. 1, the seat 3 of the motorcycle is positioned at an upper side of the seat rail 1. The seat 3 is configured such that at least a rider can be seated. With reference to FIGS. 1 and 2, the seat 3 is attached to the attachment bearing surface 30*c* of the upper surface 30*b* of the upper flange 30 via a bracket 5 which is positioned at a lower side of the seat 3.

As shown in FIG. 1, the fuel tank 4 is positioned at the upper side of the main frame 2. The main frame 2 supports the fuel tank 4 from the lower side. Furthermore, the fuel tank 4 is positioned at the front side of the seat 3. The fuel tank 4 is adjacent to the seat 3 in the front-rear direction. With reference to FIGS. 1 and 2, the fuel tank 4 is attached to the attachment bearing surface 30*c* of the upper surface 30*b* of the upper flange 30 via the bracket 5 which is positioned at the rear of the fuel tank 4. As shown in FIG. 2, the bracket 5 has: a seat attachment portion 5*a* configured such that the seat 3 is attachable; and a tank attachment portion 5*b* configured such that the fuel tank 4 is attachable.

As shown in FIGS. 1 and 2, the main frame 2 is positioned at the front side of the seat rail 1. The main frame 2 is also adjacent to the seat rail 1 in the front-rear direction. As shown in FIG. 2, a rear end region 2*a*, in the front-rear direction, of the main frame 2 has an upper fastened portion 2*b* to be respectively fastened to the upper fastening portion 21 of the two side walls 20 in the seat rail 1.

With reference to FIGS. 1 to 4, the details of the seat rail structure S will be described. In other words, the seat rail structure S can be configured in detail as follows. As shown in FIGS. 2 to 4, the upper fastening portion 21 of the side wall 20 of each side member 10 is formed to protrude frontward. The upper end section 20*b* of the front end region 20*a* of the side wall 20 is also formed to protrude frontward. The upper fastening portion 21 is a part of the upper end section 20b. The upper end section 20b protrudes frontward such that a tip portion in a protruding direction becomes the upper fastening portion 21.

As shown in FIGS. 3 and 4, the front edge portion 22 of the upper fastening portion 21 is formed to be substantially semicircular so as to include at least a part of the upper corner edge portion 24 which is substantially arcuate. The upper edge portion 23 of the upper fastening portion 21 is formed so as to extend substantially linearly. The fastening hole 26 is formed to be substantially circular. A center of curvature 26b of the fastening hole 26 which is substantially circular, nearly corresponds to a center of curvature 24b of the upper corner edge portion 24 which is substantially arcuate. The center of curvature 26b of the fastening hole 26 which is substantially circular, nearly corresponds to a center of curvature 22a of the front edge portion 22 which is substantially circular. However, the shapes of the front edge portion, the upper edge portion, the upper corner edge portion of the upper fastening portion, and the shape of the fastening hole are not limited to this. For example, the entirety of the upper edge portion of the upper fastening portion may be formed by a part of the upper corner edge portion which is substantially arcuate.

As shown in FIGS. 2 and 3, the connecting edge portion 27 is formed to include a front edge portion 41, in the front-rear direction, of the upper connecting portion 40. The main body portion 28 is positioned at the rear side of the front end region 20a of the side wall 20. The main body portion 28 is adjacent to the front end region 20a of the side wall 20 in the front-rear direction. The stepped portion 29 is positioned at the front end region 20a of the side wall 20. Furthermore, the stepped portion 29 is positioned at the upper end section 20b of the front end region 20a of the side wall 20. The stepped portion 29 is formed to be substantially in a crank shape.

As shown in FIG. 2, the upper flange 30 extends at the front end region 20a of the side wall 20, in particular, so as to straddle the main body portion 28 and the stepped portion 29. The attachment bearing surface 30c of the upper flange 30 is positioned at the rear side of the upper fastening portion 21.

As shown in FIGS. 3 and 4, the upper connecting portion 40 is formed to be in a curved shape caused by bending a plate material made of continuous fiber reinforced resin to be used for manufacturing the side member 10. To correspond to this curved shape, the inner surface 40a and the outer surface 40b of the upper connecting portion 40 are respectively formed to be substantially arcuate.

As shown in FIG. 2, the upper fastening portion 21 of the side member 10 of the seat rail 1 and the upper fastened portion 2b of the main frame 2 are fastened by a fastening means 50 including a bolt 51 and a nut 52. Although not shown clearly, in such fastening, the upper fastening portion 21 and the upper fastened portion 2b are jointly fastened between a head portion of the bolt 51 and the nut 52 in a state such that a male screw portion of the bolt 51 is inserted into the fastening hole 26 of the upper fastening portion 21 and a fastening hole (not shown) of the upper fastened portion 2b, and furthermore, the male screw portion of the bolt 51 is screwed in a female screw hole of the nut 52. However, the fastening means is not limited to these bolt and nut.

As described above, the seat rail structure S according to this Embodiment includes the seat rail 1 disposed on the vehicle body B of the motorcycle. The seat rail 1 has the side member 10 which is positioned at a lateral side in the width direction and is a bent product made of continuous fiber reinforced resin. The side member 10 includes: the side wall 20 positioned at the outer end in the width direction; and the upper flange 30 positioned at the upper end, in the upper-lower direction, of the side wall 20 to protrude from the side wall 20 toward the inner side in the width direction. The side wall 20 has the upper fastening portion 21 which is positioned at the upper end section 20b, in the upper-lower direction, of the front end region 20a in a front-rear direction and is fastened to the main frame 2 of the vehicle body B. The upper fastening portion 21 has the upper corner edge portion 24 positioned so as to straddle the front edge portion 22 in the front-rear direction and the upper edge portion 23 in the upper-lower direction. The upper corner edge portion 24 is formed to be arcuate. The rear end 24a, in the front-rear direction, of the upper corner edge portion 24 is disposed at the front side relative to the front edge portion 31, in the front-rear direction, of the upper flange 30.

Accordingly, in the seat rail structure S according to this Embodiment, when the seat rail 1 is manufactured by bending the plate material made of continuous fiber reinforced resin, there is no need to provide an excess portion for forming the upper flange 30 to the plate material, which prevents generation of corrugation due to the excess portion. Thus, poor appearance of the seat rail 1 can be prevented, the strength of the seat rail 1 can be efficiently improved, and manufacturing efficiency of the seat rail 1 can be improved.

In the seat rail structure S according to this Embodiment, the upper fastening portion 21 has the frame abutting surface 25 which abuts the main frame 2 in the width direction. The rear end 25a, in the front-rear direction, of the frame abutting surface 25 is disposed at the rear side of the front edge portion 31 of the upper flange 30. Here, in particular, in a case of the motorcycle running on a rough road and/or the like, a load is frequently applied to a rear portion, in the front-rear direction, of the seat rail 1 from a rider, a pillion rider, baggage, and/or the like. Consequently, due to the load to the rear portion of the seat rail 1, stress is easily concentrated on the frame abutting surface 25 and its peripheral portion of the upper fastening portion 21. In contrast, in the seat rail structure S according to this Embodiment, the frame abutting surface 25 and its peripheral portion overlap with the upper flange 30 in the front-rear direction. Consequently, the strength of the frame abutting surface 25 and its peripheral portion, in particular, the strength of the frame abutting surface 25 and its peripheral portion to the load can be efficiently improved by the upper flange 30, and the strength of the seat rail 1 can be efficiently improved.

In the seat rail structure S according to this Embodiment, the upper fastening portion 21 has the fastening hole 26 penetrating in the width direction to be used for fastening to the main frame 2. A rear end, in the front-rear direction, of the fastening hole 26 is disposed at the rear side of the front edge portion 31 of the upper flange 30. Here, in particular, due to the load to the rear portion of the seat rail 1 as described above, stress is easily concentrated on the peripheral portion of the fastening hole 26 of the upper fastening portion 21. In contrast, in the seat rail structure S according to this Embodiment, the peripheral portion of the fastening hole 26 overlaps with the upper flange 30 in the front-rear direction. Consequently, the strength of the peripheral portion of the fastening hole 26, in particular, the strength of the peripheral portion of the fastening hole 26 against the load can be efficiently improved by the upper flange 30, and the strength of the seat rail 1 can be efficiently improved.

In the seat rail structure S according to this Embodiment, the side wall 20 has the connecting edge portion 27 which connects the upper edge portion 23 of the upper fastening portion 21 and the front edge portion 31 of the upper flange 30 in the front-rear direction. The connecting edge portion 27 is formed to be arcuate. Consequently, the connecting edge portion 27 and its peripheral portion can be easily formed, and manufacturing efficiency of the seat rail 1 can be improved. Furthermore, stress concentration at the connecting edge portion 27 and its peripheral portion can be prevented, and the strength of the seat rail 1 can be efficiently improved.

In the seat rail structure S according to this Embodiment, the side member 10 has the upper connecting portion 40 which connects the side wall 20 and the upper flange 30. The upper connecting portion 40 has: the inner surface 40a which connects the inner surface 20c, in the width direction, of the side wall 20, and the lower surface 30a, in the upper-lower direction, of the upper flange 30; and the outer surface 40b which connects the outer surface 20d, in the width direction, of the side wall 20, and the upper surface 30b, in the upper-lower direction, of the upper flange 30. The inner surface 40a and the outer surface 40b of the upper connecting portion 40 are respectively formed to be arcuate. Due to this, breakage of continuous fibers included in the upper connecting portion 40 to be bent when the upper flange 30 is formed, can be prevented. Due to the upper connecting portion 40, stress concentration generated between the side wall 20 and the upper flange 30 can be inhibited. Thus, the strength of the seat rail 1 can be efficiently improved.

In the seat rail structure S according to this Embodiment, the side wall 20 has: the main body portion 28 positioned at the rear side and the outer side, in the width direction, of the upper fastening portion 21; and the stepped portion 29 which connects the upper fastening portion 21 and the main body portion 28. Here, in particular, due to the load to the rear portion of the seat rail 1 as described above, stress is easily concentrated on the upper fastening portion 21 and the main body portion 28 of the side wall 20. In contrast, in the seat rail structure S according to this Embodiment, the strength of the upper fastening portion 21 and the main body portion 28, in particular, the strength of the upper fastening portion 21 and the main body portion 28 to the load can be efficiently improved by the stepped portion 29, and the strength of the seat rail 1 can be efficiently improved.

In the seat rail structure S according to this Embodiment, the seat rail 1 has the two side members 10 disposed so as to be spaced apart from each other in the width direction, and the upper surface 30b in the upper-lower direction of the upper flange 30 in each side member 10 includes the attachment bearing surface 30c to be used for attachment of the seat 3 and/or the fuel tank 4. Consequently, the seat 3 and/or the fuel tank 4 can be easily attached, and manufacturing efficiency of the seat rail 1 can be improved.

While the Embodiment of the present invention has been described so far, the present invention is not limited to the above Embodiment, and the present invention can be varied and modified based on its technical concept.

REFERENCE SIGNS LIST

B . . . Vehicle body
S . . . Seat rail structure
1 . . . Seat rail, 2 . . . Main frame, 3 . . . Seat, 4 . . . Fuel tank
10 . . . Side member
20 . . . Side wall, 20a . . . Font end region, 20b . . . Upper end section, 20c . . . Inner surface, 20d . . . Outer surface, 21 . . . Upper fastening portion, 22 . . . Front edge portion, 23 . . . Upper edge portion, 24 . . . Upper corner edge portion, 24a . . . Rear end, 25 . . . Frame abutting surface, 25a . . . Rear end, 26 . . . Fastening hole, 26a . . . Rear end, 27 . . . Connecting edge portion, 28 . . . Main body portion, 29 . . . Stepped portion
30 . . . Upper flange, 30a . . . Lower surface, 30b . . . Upper surface, 30c . . . Attachment bearing surface, 31 . . . Front edge portion
40 . . . Upper connecting portion, 40a . . . Inner surface, 40b . . . Outer surface Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A seat rail structure for a motorcycle, comprising a seat rail disposed on a vehicle body of the motorcycle, wherein:
   the seat rail has a side member which is positioned at a lateral side in a width direction of the vehicle body and is a bent product made of continuous fiber reinforced resin;
   the side member has: a side wall positioned at an outer end in the width direction of the vehicle body; and an upper flange positioned at an upper end, in an upper-lower direction of the vehicle body, of the side wall so as to protrude from the side wall inward in the width direction of the vehicle body;
   the side wall has an upper fastening portion which is positioned at an upper end section, in the upper-lower direction of the vehicle body, of a front end region in a front-rear direction of the vehicle body, and is fastened to a main frame of the vehicle body;
   the upper fastening portion has an upper corner edge portion positioned so as to straddle a front edge portion in the front-rear direction of the vehicle body and an upper edge portion in the upper-lower direction of the vehicle body;
   the upper corner edge portion is formed to be arcuate, and a rear end, in the front-rear direction of the vehicle body, of the upper corner edge portion is disposed frontward in the vehicle body relative to a front edge portion, in the front-rear direction of the vehicle body, of the upper flange.

2. The seat rail structure for a motorcycle according to claim 1, wherein;
   the upper fastening portion has a frame abutting surface which abuts the main frame in the width direction of the vehicle body, and
   a rear end, in the front-rear direction of the vehicle body, of the frame abutting surface is disposed rearward in the vehicle body relative to the front edge portion of the upper flange.

3. The seat rail structure for a motorcycle according to claim 1, wherein;
   the upper fastening portion has a fastening hole penetrating in the width direction of the vehicle body so as to be used for fastening to the main frame, and
   a rear end, in the front-rear direction of the vehicle body, of the fastening hole is disposed rearward in the vehicle body relative to the front edge portion of the upper flange.

4. The seat rail structure for a motorcycle according to claim 1, wherein;

the side wall has a connecting edge portion which connects the upper edge portion of the upper fastening portion and the front edge portion of the upper flange in the front-rear direction of the vehicle body, and the connecting edge portion is formed to be arcuate.

5. The seat rail structure for a motorcycle according to claim 1, wherein;

the side member has an upper connecting portion which connects the side wall and the upper flange, the upper connecting portion has: an inner surface which connects an inner surface, in the width direction of the vehicle body, of the side wall, and a lower surface, in the upper-lower direction of the vehicle body, of the upper flange; and an outer surface which connects an outer surface, in the width direction of the vehicle body, of the side wall, and an upper surface, in the upper-lower direction of the vehicle body, of the upper flange, and the inner surface and the outer surface of the upper connecting portion are respectively formed to be arcuate.

6. The seat rail structure for a motorcycle according to claim 1, wherein;

the side wall has: a main body portion positioned rearward in the vehicle body and outward in the width direction of the vehicle body relative to the upper fastening portion; and a stepped portion which connects the upper fastening portion and the main body portion.

7. The seat rail structure for a motorcycle according to claim 1, wherein;

the seat rail has two of the side members disposed so as to be spaced apart from each other in the width direction of the vehicle body, and an upper surface, in the upper-lower direction of the vehicle body, of the upper flange of each side member, includes an attachment bearing surface so as to be used for attachment of a seat and/or a fuel tank.

* * * * *